(12) United States Patent
Pinto et al.

(10) Patent No.: US 8,147,960 B2
(45) Date of Patent: Apr. 3, 2012

(54) BACTERICIDAL FILLER COMPOSITION

(75) Inventors: Mónica Claudia Pinto, Buenos Aires (AR); Alejandra Edith Vorobey, Buenos Aires (AR); Carlos Alberto Moina, Buenos Aires (AR)

(73) Assignee: Instituto Nacional De Tecnologia Industrial (INTI), San Martin, Provincia de Buenos Aires (AR)

( * ) Notice: Subject to any disclaimer, the term of this patent is extended or adjusted under 35 U.S.C. 154(b) by 508 days.

(21) Appl. No.: 12/110,924

(22) Filed: Apr. 28, 2008

(65) Prior Publication Data

US 2009/0188408 A1    Jul. 30, 2009

(30) Foreign Application Priority Data

Jan. 25, 2008    (AR) ................................ P080100303

(51) Int. Cl.
*B32B 5/66* (2006.01)

(52) U.S. Cl. ........................................ 428/403; 428/404
(58) Field of Classification Search .................. 428/403, 428/404
See application file for complete search history.

(56) References Cited

U.S. PATENT DOCUMENTS 6,147,156 A * 11/2000 Yamaya et al. ............... 524/806
7,476,698 B2 * 1/2009 Wagener et al. .............. 523/122

* cited by examiner

*Primary Examiner* — Leszek Kiliman
(74) *Attorney, Agent, or Firm* — Muncy, Geissler, Olds & Lowe, PLLC

(57) ABSTRACT

A bactericidal composition comprising inorganic fillers having modified surface with submicrometric particles of a metal and/or salts thereof. Use of the composition in the preparation of latex paints, solvent based paints, powder paints, plasterings, putties, pre-dosed renderings and hydrophobic mass additives.

10 Claims, 1 Drawing Sheet atomic force microscopy image (AFM) of bactericidal cores deposited on inorganic filler.

BACTERICIDAL FILLER COMPOSITION

FIELD OF THE INVENTION

The present invention refers to a composition of superficially modified inorganic filler particles having bactericidal properties and to a process for preparing the same. The composition of this invention is intended to confer bactericidal activity to coating formulations such as paint, plastering, putty, rendering, and the like.

BACKGROUND OF THE INVENTION

The development of paint for use in places where the bacteriostatic activity is essential represents a challenge for this industry, particularly in hospital environments where the goal is that all painted surface will prevent the formation of bacteria colonies. These coatings should show high bactericidal power, low or even no toxicity for human beings and low environmental impact; their cost should be reasonable and within the range of other industrial paints.

Several strategies have been followed to reach to these objectives. For instance, modified bacteriostatic agents have been developed to be included in the polymer network. This approach to the problem has several drawbacks. On the one hand, it is difficult to formulate broad spectrum antibacterial agents compatible with an industrial process such as the manufacture of paint. Besides, these agents tend to degrade quickly severely limiting the product life time. Another strategy has been the use of metal salts such as silver, encapsulated in natural clay such as zeolites EP 0 116 865 (1984). In this case, the clay must be processed to make it compatible with the paint components. On the other hand, in these cases the bactericide must migrate or diffuse from the interior of its capsule up to the place where it should exert its bactericidal activity.

In the last few years, the use of $TiO_2$ photocatalytic nanoparticles (NP) for the broad spectrum antibiosis has been successfully experimented. (Wang, R., Kashimoto K., Fujishima A., et al; Nature 388 (1997) 431, Hagfeldt A., Gratzel M.; Chem. Rev. 95 (1995) 49, Williams A. J., Pin C. M.; Environ. Sci. Tech. 32 (1998) 2650) and patent publication WO2006/061367. Combined NP systems of $TiO_2/M^+$ (M=Cu, Au, Ag) have been used as particles with bacteriostatic properties in plastics, glass coatings, fibers and material for medical purposes (Oloffs A. et al; Biomaterials 15 (1994) 753; Kawashita M., Tsuneyama S. et al; Biomaterials 21 (2000) 393; Q. Cheng, Ch. Li et al; Appl. Surf. Sci. (2005) and Patent EP0251783 B1). In these compound systems, the monovalent metal plays a key role when reacting with certain essential amino acids of the bacteria. However, in a paint, the presence of pigment ($TiO_2$) with photocatalytic properties is counterproductive, since it may degrade the polymeric film.

Also, one of the components of paint are inorganic powders, called fillers which are used to modify the paint properties such as abrasion resistance, outdoor resistance, permeability, gloss, etc. Since inorganic fillers represent a high percentage in volume of a dry paint film, their use as carrier of bactericidal components would result in a suitable method for providing the bactericidal properties to the whole volume of a coating formulation such as a paint.

SUMMARY OF THE INVENTION

An object of the present invention is to provide a bactericidal composition comprising surface modified inorganic fillers, said inorganic fillers being the type used in the formulation of coating such as paint, plastering, putty, rendering, and the like.

An object of the present invention is to provide a bactericidal composition comprising cores of inorganic fillers coated with metal and/or metal salts submicrometric particles, the metal being preferably selected from gold, platinum, silver and copper, the salts preferably being selected from gold, platinum, silver and copper sulfates, cyanides, chlorides, acetates and nitrates.

Since the fillers represent an important percentage of the dry film of a coating, the use of bactericidal fillers of the invention allows for a better dosage of the bactericide. Besides, the uniform distribution of the fillers throughout the thickness of the coating compositions once it has been applied ensures the permanence of the bactericidal power throughout its entire life time.

Advantageously, the fillers of the invention do not alter the physico-chemical properties of the paint, such as its thixotropy, surface tension, sedimentation, etc. not resulting therefore necessary to modify the formulation of the same.

A further object of the invention is a process for the preparation of a bactericidal composition comprising dispersing a given filler mass in an aqueous solution of a metal M salt, where M may be Pt, Au, Cu or Ag, heating the suspension, adding a reducing agent, continuing with the heating, cooling, separating the solids, and drying.

The present invention provides a latex paint, solvent base paint, powder paint, plasterings, putty, pre-dosed renderings and hydrophobic mass additives, comprising the bactericidal filler composition of the invention.

BRIEF DESCRIPTION OF THE DRAWINGS

FIG. 1 shows an atomic force microscopy image (AFM) of bactericidal cores deposited on inorganic filler, according to the present invention.

DETAILED DESCRIPTION OF THE INVENTION

Paint can be defined as the dispersion of a pigment in a medium called vehicle. The vehicle is usually formed by the dissolution of a polymeric substance called binder or resin, in a solvent. However, in paint and coating formulations in general, other ingredients called additives are used, these being of very diverse chemical nature; their function being very varied: to help with the manufacturing process, to provide stability to the finished product, to regulate the rheology, gloss, ease of application, etc. Fillers, in particular, are low cost materials that modify main properties such as outdoor resistance, permeability, abrasion and formation of cracks resistance, gloss, etc. The fillers are powders substantially insoluble in the vehicle. Among the most common fillers we can mention barite (barium sulfate), calcite (calcium carbonate), calcium sulfate, talc, mica, quartz ($SiO_2$), microcline ($KAlSiO_3$), aluminum and/or magnesium silicates, mica, dolomite, kaolin, etc.

According to the present invention, superficially modified inorganic fillers are prepared with bactericidal properties destined to be used in the formulation of coating, these fillers being constituted as cores coated by metal and/or metal salt particles, having bactericidal properties.

The preparation of the modified fillers of the invention is carried out through the dispersion of a given filler mass in an aqueous solution of the metal salt. The suspension is heated. Then, an adequate reducing agent is added and heating continues. Once the reaction has concluded, it is allowed to cool; the solids are separated and dried.

The starting filler particles may be the fillers conventionally used in coatings such as paint, plastering, putty, pre-dosed renderings, hydrophobic mass additives such as those used in coarse rendering. Preferably, the filler can be selected from chalk, calcite, calcium carbonate, dolomites, diatomites, mica and barite.

The metal salt used in the preparation of the modified fillers of the invention may be selected from gold, copper, silver or platinum salts, the anions of the salts being preferably selected from nitrite, perchlorate, sulfate and even more preferably chloride and cyanide.

The reducing compound may be sodium borohydride, dimethyl-aminoborane, hydroxylamine, hydrazine, hydroquinone, sodium citrate and/or formaldehyde. Preferably, sodium borohydride and dimethyl-aminoborane are used. The reaction temperature may be in the range of $0°$ C.-$100°$ C. The reaction time is of at least 30 minutes, preferably between 30 and 120 minutes.

Once the reaction is complete, the mixture is stirred until it reaches room temperature. The solid is separated by an adequate method, such as for example centrifugation or filtration. The solid is dried at temperatures in the range of $27°$ C.-$100°$ C., preferably at $100°$ C.$\pm 2°$ C., preferably in a stove.

The resulting filler particles surface will be covered by cores or discrete metal and/or metal salt bactericidal particles. The size of the cores or particles will be in the range of 50-300 nm.

According to a preferred embodiment, the preparation of the modified fillers of the invention is carried out through the dispersion of a given filler mass in an aqueous solution of silver cyanide and sodium, sodium cyanide and sodium hydroxide. The suspension is heated while being stirred, subsequently adding an adequate reducing agent such as dimethyl-aminoborane. The reaction is made while it is being stirred and heated. Once the reaction has concluded, it is allowed to cool; solids are separated, then washed and dried. The surface of the resulting filler particles will be coated by cores or discrete particles of bactericidal silver and/or silver compounds. The size of the cores or particles will be in the range of 50-300 nm.

Definitions

As previously indicated, paint can be defined as the dispersion of a pigment in a medium called vehicle. The vehicle is constituted usually by the dissolution of a polymeric substance, called binder or resin, in a solvent, that, together with the pigment and the fillers, are the four main components of a paint. The problem of this definition is that it does not include powder paint, which we may define as a mixture of resins, hardeners, pigments and additives in solid state.

Paint does not necessarily have all of these components. For instance, powder paint does not contain any solvent and varnish does not have any pigment or filler.

Resin may be a sole product or a combination of several products wherein each one provides the compound with its specific properties (adherence, gloss, chemical resistance, etc.). The mission of the solvent is to regulate the paint viscosity during the manufacturing process as well as during the application process. The evaporation speed of the solvent also determines the drying time of the paint.

Finally, in paint formulations, other ingredients called additives are used, which are products of very different chemical nature; they are often minority components in the formulations and their function is very varied: they may be used for assisting in the manufacturing process, for providing stability to the finished product, for regulating the rheology, the gloss, the ease of application, etc.

Resins

The function of the resin is to disperse the pigment particles and to serve as an anchorage of the paint to the substrate. It must have a good binding capacity and, at the same time, good chemical and mechanic resistance. Two of the decisive criteria when selecting a resin for a concrete application are adherence and chemical resistance.

The resins used in the formulation of paint can be classified according to the film formation mechanism. These mechanisms are:

i) by chemical reaction: the resin monomers are dissolved within the vehicle. Once the paint has been applied, the solvent is evaporated, the films is shrinked thus "curing" the film as a result of the polymerization of the resin monomers.

ii) by physical drying: In this case, the vehicle is a thermoplastic polymer dissolution. The film is formed by simple evaporation of the solvent. There is no chemical reaction during the formation of the film and the resin molecules bind to each other by cohesion forces.

Among the most used resins for obtaining aqueous dispersions, we can mention: polyvinyl acetate, styrene-butadiene, acrylic resins, styrenated acrylic resins, etc.

The properties that should be evaluated when selecting a type of resin are: cost, adherence, wetting capacity of the pigments, viscosity, leveling, hardness, compatibility with other resins, durability, capacity to penetrate in porous substrates, gloss and gloss retention in time, color and color retention (resins that turn yellow after certain time are not adequate to formulate white paint), heat resistance and drying time and conditions.

Solvents

Solvents form the volatile fraction of the vehicle in liquid paint. Their main function is to regulate the viscosity of the system during the manufacture and application of the paint. Once the paint has been applied, the solvent evaporates within a certain time and stops being part of the system.

The solvent present in a given vehicle may exert one of the three following functions:

a) True solvent: the true solvent is able, by itself, to form clear and transparent dissolutions with the resin. Its presence is the most contributing to thin the viscosity of the vehicle.

b) Latent solvent: this solvent is not capable by itself of dissolving the resin, but, in the presence of a true solvent it behaves as if it were true and therefore, it also contributes to thin the viscosity of the system.

c) Thinner: It is not capable of dissolving the resin but it is endured by the system in certain proportions. It is also added frequently to improve the applicability by decreasing viscosity.

Pigments

The pigment is the part of the paint that disperses in the vehicle; the pigment is formed by finely divided inorganic or organic solid particles, which are practically insoluble in the vehicle.

Its function within a paint is diverse:

It provides opacity to the paint. This property is obtained through the diffuse dispersion of the light. It is related to the change in the refraction index value in the resin-pigment interfaces. The larger the difference, the greater the opacity obtained. This property also depends on the dispersion rate obtained when manufacturing the paint. The opacity measurement allows to evaluate the coating capacity of the paint's film.

It provides a specific color to the paint in order to obtain certain decorative effect. The number of colored pigments is equivalent to the huge shade of imaginable colors.

Pigments are also useful as anticorrosive protection, as for example in zinc-rich paints.

Among the most common pigments we can mention the titanium dioxide, iron oxide, zinc chromates, smoke black, copper phtalocyanine, etc.

Fillers

Fillers are constituted by powder practically insoluble in the vehicle. In general, they are low cost materials that modify important properties such as outdoor resistance, permeability, abrasion resistance, gloss, formation of cracks, etc. Among the most common fillers, we can mention: barite (barium sulfate), calcite (calcium carbonate), calcium sulfate, talc, mica, quartz ($SiO_2$), microcline ($KAlSiO_3$), kaolinite, which is an alkaline aluminum silicate, dolomite, kaolin, etc.

Additives

They are a very varied group of products used in the formulation of paint with different functions, in order to obtain a desired property or to solve a specific problem. Frequently, however, the use of an additive may improve one or several properties (multifunctionality) and at the same time, the additive may have an unfavorable effect on other properties. For this reason care should be taken when choosing an additive and when determining the dose to be used since certain additive may function well for one formulation and may not have any effect in another.

Some of the important functions performed by the additives are:

Helping with the manufacturing process. For example, wetting, dispersing, antifoam additives.

Contributing to the stability of the finished paint. For example, anti-settling, anti-skinning additives.

Conferring some interesting properties in relation with the application method. For example, thickening, anti-splashing, leveling, anti-sagging additives.

Conferring some desired property to the paint film once dry. For example, plasticizing, matting, anti-scratching, UV-absorbing, bactericidal additives.

The main types of additives are described below, as well as their function and mechanism by which they act.

Dispersing Additives

They are used to promote the separation of the individual particles of the pigments, being absorbed on the surface of the pigment, and establishing connecting points with the resin; they function as a binding bridge between the pigment and the resin. In order to obtain a stable dispersion, the bonds pigment-resin through the dispersant have to be stronger than the attraction forces between the pigment particles.

The dispersion process shows different features in the emulsion solvent based paint and water based paint.

The presence of the dissolving resin eases by itself the dispersion process, mostly if it is a good wetting agent. The resin may coat the pigment particles and therefore prevent them from regrouping once the dispersive action has stopped. If the resin is not a good wetting agent, dispersing additives whose main action is to thin the surface tension of the resin are used to improve its wetting capacity.

The use of dispersant is essential to avoid flocculation (regrouping of the pigment particles) once the grinding has concluded.

Anionic dispersants are the mostly used dispersants: sodium or potassium salts of polyphosphoric or polycarboxylic acids that are absorbed on the pigment surface and confer an electric charge to the same. The repulsion effect between charges of the same charge keep particles apart.

The use of dispersants contributes to obtain stable dispersions and also greatly reduces the energy that has to be employed in the grinding phase. By making the grinding easier, the overall cost of the manufacturing process is reduced.

Plasticizers

Many of the resins used in the paint industry form hard though fragile films. This phenomenon, characteristic of resins such as cellulose acetate or vinyl resins would produce paints that would tend to crack due to lack of flexibility. The plasticizers confer flexibility to those resins. The plasticizer action is based on the fact that certain solid or liquid high boiling point substances are capable of solvating the molecules of some resins. This way, the structure of the resin loses rigidity and earns flexibility.

An important property of plasticizers is that they must remain in the paint's film once applied. This requirement can usually be obtained, although some of the products used have some volatility and might migrate from the film after certain time. On the contrary, the most effective plasticizers generally are the more volatile and vice versa. Another requirement that a good plasticizer has to comply with is having good compatibility with the resin. The most compatible plasticizers are those that have a better solvating action and vice versa.

In the paint industry, the following types of plasticizers are generally used: natural non drying oils, high boiling point monomers (for example, phthalates, phosphates, glycolates), polymers (for example, chlorinated paraffins).

Antifoams

The inclusion of air in the manufacture of paint is an undesired phenomenon. In the first place, this increases the processing costs, since it lengthens the manufacturing as well as packaging time. Besides, if the emulsified air is not eliminated conveniently, bubbling problems may appear during application, particularly when using paint brushes and rollers. This problem is extremely important, mainly in the field of water based paint, as water is very prone to the formation of bubbles, due to its polar feature and its high surface tension.

Antifoam agents avoid the formation of foam during the manufacture of paint or eliminate the same once it has been originated. General standards for the selection of an antifoam additive can be listed as: i) its surface tension must be lower than that of the medium; ii) the additive should not chemically react with the medium; iii) the additive should not affect the properties of the paint dry film.

Among the mostly used antifoam agents in the paint industry, we may mention: low HLB surfactant (hydrophilic/lipophyllic balance), silicones, alcohols in the carbon range of 6 to 10.

Thickeners

The viscosity of a formulation depends on the nature of the vehicle and pigment, on the concentration of the pigment and on the dispersion rate of the same. In first instance, these factors may be handled in order to adjust them to the desired viscosity; in several other instances this will not be possible and therefore, some type of additive will have to be used to regulate the same. Usually, we intend to "give body" to the paint, that is, to increase its viscosity.

There are several types of thickening additives useful for the different types of systems and applications. Particularly useful are those that, when increasing the viscosity, they confer the paint a thixotropic rheology. A system is referred to as thixotropic when its viscosity diminishes when applying an external force and it is gained back when the force is withdrawn. This behavior can be explained as follows: at steady state, an interaction network is formed to a molecular level, which creates a kind of structure capable of reducing the mobility and therefore, the flowing capacity. When applying an external force such as stirring or shearing, said structure is broken, mobility increases and consequently, viscosity decreases. When the external force stops, the structure reconstructs itself. The thixotropy is an important property for two reasons. Firstly, it eliminates or reduces the tendency of pigments to sediment, providing stability to the paint, mostly in terms of storage. Secondly, it eliminates or reduces dripping when it is applied. The addition of thickeners may take place within the formulation before or after the grinding phase. They may also be used as viscosity correctors in finished paint batches.

An expected property in any thickener system is that it would keep its properties stable after a certain lapse of time. In some cases, thickeners do not develop all their properties up to 24 or 48 hours after being added.

Cellulose thickeners used in water based paint are susceptible to bacterial attack. A paint undergoing such an attack will show an evident viscosity decrease. Due to this and other reasons, water based paint must be added with bactericide substances.

Anti-settling and Anti-sagging Additives

As previously mentioned, many of the thickener additives have a further anti-settling or anti-sagging function. The settling tendency is directly proportional to the specific gravity and size of the pigment particle. A good dispersion of the pigment reduces the settling tendency. There are surfactant additives that favor dispersion of the pigment, that is, they break agglomerates. Even though this mechanism may not avoid settling completely, said additives are adsorbed in the pigment particles surface, producing a stabilizing effect in the dispersion. If there is some settling, the sediment obtained will not be hard and compact but rather soft and easily added back again. The formation of soft sediment is a minor defect and in many cases it will be considered as acceptable. The soy lecithin is an example of this type of additives.

Biocides

Water based paint constitutes a favorable medium for the growth and reproduction of organisms such as bacteria, fungus, etc. This is a non desirable phenomenon, since it produces alterations in the properties of the paint as well as causes a decrease in the viscosity by degradation of the cellulose thickeners and produces the apparition of a foul smell. To avoid this type of contamination, products must be added to eliminate these organisms or to prevent their reproduction; in order for these additives to be effective, they must be water soluble.

Mercury phenyl acetate and other organomercurial products have been widely used for the protection within the package of emulsion paint though their use has been discontinued for toxicity and environmental contamination criteria. Today, formol releasing products and soluble isothiazolinone derivates are used, among others.

Another side of the same problem is the proliferation of fungus, algae and lichen on the surface of the paint films. In order to avoid the same, biocide products having low solubility in water that would ensure their permanence in the film must be sought. Such products are benzimidazoles, carbamates, dithiocarbamates and low soluble derivatives of isothiazolinone.

Levelers

Paint with a good leveling capacity is that producing flat smooth surfaces, irrespective of the application method used. In practice, paint with good leveling will be the one that once applied with paintbrush or brush, it is capable of flowing and producing a smooth surface, thus eliminating the grooves created by said application method. In general, the best way to obtain a good leveling is to act on the resin, pigments and mixture of solvents selection.

Latex Based Paint

Latex based paint uses water as majority solvent diminishing the percentage of organic solvents, called in this case co-solvent or coalescent. The film formation mechanism of this type of paint is known as coalescence and consists on the fusion of the resin particles that get in touch with one another while the solvent evaporates. This process is made with the help of certain type of products called coalescent. These substances are organic solvents with low or moderate volatility, capable of "wetting" the polymeric material in the resin particles. An interface is formed between neighboring particles, which will remain together once the coalescent has evaporated. Therefore, the film is not completely formed until the coalescent has fully evaporated. The function of the coalescent can be described as a temporary plasticizer. Two of the most common coalescent for dispersion in aqueous paint are butylglycol and xylol. Adequate coalescent type and dose may have great influence on one of the most appreciated properties of latex based paint, which is the washability.

There are two basic types of latex based paint:
emulsion (using emulsified resins)
hydrosoluble paint (water soluble resins)

Emulsions

An emulsion is a two-phase system in which a liquid is dispersible as two small units (micelles) through other liquid. The dispersed liquid (minority) is called internal phase (discontinuous) and the dispersion medium, is called external phase (continuous). An exemplifying emulsion is the emulsion of oil in water. The discontinuous phase (dispersed) is the oil (in droplets) and the continuous, is water.

In the water based emulsion, we can distinguish:
Emulsions per se: the dispersed particles are not water soluble; they need a protecting colloid for the system to be stable.
Colloidal dispersions: it is an intermediate system between a solution (such as the resin in solvent solution) and an emulsion, that is, the particles are partially soluble in the aqueous medium, though the water insoluble part is easily emulsified.

Hydrosoluble Paint

This type of paint was developed to decrease the contaminant effect of resins to the solvent. Its main utility is that the resin is formed by condensation of synthetic resins that may be phenolic resins, alkyd resins, etc. modified with different types of oil and that are water soluble. However, they should not be mistaken for the emulsion of latex paint.

Interior Latex Paint

The base resin of the mostly used paint of this type is vinyl or acrylic acetate copolymer, styrene-butadiene copolymers being used for less expensive paint. This type of paint is easy to apply and dries quickly with no foul smell. The paint brushes and rollers used for applying the same are cleaned with water. Due to the presence of water sensitive materials and to very high pigment and filler concentrations, the films of emulsion paint of this type are sensitive and porous to water vapor, but may be washed easily.

A typical formula of interior latex paint is as follows:

| | |
|---|---|
| Water | 41.80 |
| Antifoam | 0.15 |

-continued

| | |
|---|---|
| Biocide | 0.20 |
| Acrylic Thickener | 0.50 |
| Turpentine or white spirit | 0.60 |
| Ammonia | 0.05 |
| Ethylene Glycol | 0.80 |
| Coalescent | 0.40 |
| Acrylic Dispersant | 0.20 |
| Nonyl Phenol 10M | 0.05 |
| Sodium Hexametaphosphate | 0.25 |
| Titanium Dioxide | 16.00 |
| Calcium Carbonate 325 | 5.20 |
| Precipitated Calcium Carbonate | 17.00 |
| Micronized Calcined Kaolin | 2.50 |
| Acrylic Styrene Emulsion | 16.00 |
| Bentonite | 0.30 |
| Total | 100.00 |

A generic process to manufacture water based paint in emulsion is described below, using a dispersing machine, also indicating the order in which the products that form part of the formulation are incorporated:
1. Add water to the reactor.
2. Start the stirrer with shear teeth disk.
3. Add thickener and ammonia that will increase viscosity and will assist in the formation of a gel.
4. Add the additives: wetting, dispersant, antifoam additives.
5. Add the pigments and fillers.
6. Increase the revolutions of the disperser, to increase the shear effect during the time required for obtaining the desired dispersion.
7. Decrease the revolutions of the disperser to stop the shear effect.
8. Slowly add the emulsion resin.
9. Add the coalescent.
10. Adjust the color with hydro-universal paste for colored paint.
11. Adjust the pH to 8-9 with ammonia at 25% per volume, if necessary.
12. If necessary, add water to adjust the constants such as viscosity, density and solids per weight.

As a general rule, the products will be added always while being stirred. The stirring rods provided with "saw teeth" provide the most effective shear and disperse better.

In case a ball mill is used for the manufacture of paint, the order in which the components are added may be the following:
1. Solvent, dispersant, wetting agent, antifoam, titanium dioxide and fillers. The necessary solvent amount must be added so that the mill works properly and produces an adequate grinding.
2. Resin
3. Solvent necessary to adjust the constants
4. Coalescent
5. Biocides Formulation of Paints In the paint industry, the formulation process consists on developing a recipe comprising:
A selection of raw materials.
Their relative proportions.
A manufacturing process.
The purpose is to obtain a product complying with one or several requirements. These requirements are:
i) Adherence to the substrate on which it is applied, which is a vital feature required to obtain a good paint behavior, ii) decoration, visual aspect, iii) durability, the paint should not deteriorate with the action of external agents causing the loss of protective or decorative properties, iv) stability within the package to avoid the formation of skins, sediments or gelling. The possible interactions between the paint and the package containing the same should also be considered. For latex paint plastic packages are advisable. It is important for the packages to be hermetic to avoid any solvent loss preventing therefore any alteration of the proportionality of the formulation, v) cost. In the paint industry, the cost factor is very important over the product formulation. The general aim is to obtain a product complying with the desired requirements with minimum raw material and manufacturing costs. Upon the occurrence of a specific formulation problem, several possible solutions may arise, however, the ways of solving the same and their cost may vary. The choice of one of them will depend on which property we will consider most important and which one can be sacrificed at a reasonable cost, vi) ecology, environment and toxicity. The respect for the environment and health is a criterion that is getting more important on a day-to-day basis. The formulations of products considered hazardous, as for instance preserving agents formed by organomercurials, pigments containing lead, certain organochlorinated solvents, etc. are being gradually eliminated. The minimization of the generated waste should also be a criteria when formulating a paint and, particularly, when setting the manufacturing process.

Manufacturing Stages

In order to obtain the dispersion in immiscible phases (solids and liquids) it is essential to go through the following very different stages: pasting, grinding, transformation, adjusting, filtering and packaging—the last one is not a stage in itself, since it does not alter the features of the manufactured paint.

In the first phase an initial pre-mixture of the moisturizer with part of the vehicle and ammonia is made to form a gel. After that, it is grinded in a mill or other dispersion equipment. The aim is to disperse the pigment in the most efficient, fast and less expensive way, separating the pigment particles aggregates into their elemental particles.

The dissolution or completion stage consists on adding to the grinding paste the rest of the formulation: the rest of the resin, solvent and additives.

This way, the process starting at the pasting consists of mixing in a container the indicated raw materials and homogenizing the same by stirring. The stirring rod, besides mixing, has dispersing properties.

Once this homogenization is achieved, the agglomerates formed by the pigments and fillers must be separated. Sometimes a vigorous stirring is sufficient (dispersion mode), but some other times a more aggressive method is necessary (grinding mode). The grinding point will indicate if the separation of the agglomerates has been achieved. Of course, if the desired grinding is not obtained, this stage should be repeated as many times as necessary to reach the same.

Once the desired grinding point is reached, the next stage is the transformation, consisting in adding the rest of the raw material, mainly resin and solvent (in some cases, some special additive). In this stage, part of the solvent is left aside for cleaning.

In case there is no "flocculation" in the previous stage, the color, viscosity, etc. adjustments will be performed.

The last stage includes the filtration and packaging.

Each stage is individually analyzed below:

Gel Formation

Gel formation is the beginning of any paint manufacture. In this stage, the solvents, the thickener and ammonia are mixed in a stainless steel container or reactor. The order of the addition of the raw materials is not random, since it has been proven that better results can be achieved if the mix is made as indicated below:
1. Part of the solvent
2. Thickener and ammonia/start the stirrer up to the formation of a gel.
3. Wetting, dispersant and antifoam additives/control the physical aspect by extending on glass the manufactured product, controlling the absence of floccules or solid particles.
4. Inorganic pigments.
5. When adding fillers, the should be made from higher to lower density fillers.
6. Another part of the solvent to cool the sample/increase the speed of the stirrer.
7. Emulsion resin
8. Coalescent (If this is not incorporated to the resin emulsion)
9. Bactericides.
10. The remaining of the solvent to adjust viscosity Grinding Grinding is the mechanic breaking and separation in primary particles. The aim of grinding is to obtain the optimum dispersion that has not been achieved with the wetting at the pasting or gel formation. This is the most time and energy consuming operation of the whole paint production process, and should be controlled through the measuring of the particle size with a grinding wedge BYK GARDNER or SHEEN.

Transformation

At this stage, the grinding paste is stabilized and the final formula of the finished product is achieved.

The flocculation is defined as regrouping the already dispersed particles of a pigment, which provides for a much thicker grinding than that obtained. This is a risk at this stage since it would mean going back to the previous stage: grinding. It is important to obtain grinding pastes as concentrated as possible, as this way less quantity is processed and the process is shorter. By making a more concentrated paste, the flocculation hazard increases since the difference of concentrations between paste and resin is higher.

Filtering

Once the adjustments have concluded, the following step is the packaging; filtering will be performed when packaging. Even though the paint may have the adequate grinding, it is necessary to filter the same to extract possible contaminants larger than grounded size. This way the film will be uniform avoiding any filter and nozzle clogging in the automatic or robotized painting. Filtration consists simply on the separation of particles from a fluid by the passage of the same through a permeable means. A good fiber filter is that retaining the particles at most in the first 20% of the thickness. The filter mostly used in coating industry is the fix-pore type filter whose pores do not increase in size at high differential pressure. It is convenient to choose a filtering size a little higher than that defined in the grinding.

Packaging

The packaging process includes the physical filtration, and therefore, there are two distinguishable types of packaging, independently from the filtration method chosen:

Manual packaging: it simply consists on previously filtering the paint and filling in the packages at an established weight, with the help of a scale; in this case, the filter mostly used is vibrant and the aforementioned filter cartridges.

Automatic packaging: all handling is made automatically.

There is a range of tools and machines executing a sole independent function in the packaging process, therefore, there are commercially available machines that filter, dose, close packages (closers), etc.

The invention will now be described through experimental examples, which will illustrate the preparation of the composition of the invention, as well as the bactericide effectiveness of the same as compared to known compositions. The following examples are provided solely with illustration purposes and should not be considered as limiting in any way the scope of the invention. The experts in the art will promptly see a variety of non critical parameters that may be changed or modified to render essentially similar results.

EXAMPLES

Example 1

Preparation of Bactericidal Filler 100 g barite were weighted and placed in an adequate container. A liter of an aqueous solution of 2 grams of silver and sodium cyanide plus 1.2 grams of sodium cyanide and 1 gram of sodium hydroxide was added. The mixture was taken at 60° C. while mechanically stirring with a rotary stirrer. Subsequently, 2 grams of dimethyl-aminoborane were added. Heated was continued at 60° C. while stirring during a minimum period of 30 minutes. The container was withdrawn from the heat source, it was allowed to cool down, solids were separated by filtering and the solid residue was washed twice with deionized water. The residue was dried in stove at 100° C.±2° C. Barite particles homogeneously coated by silver cores or discrete silver particles were obtained with a size in the range of 120 nm, measured by electronic scanning microscopy images and/or atomic force microscopy (see FIG. 1).

Example 2

Preparation of Bactericidal Paints

Latex paint samples with modified fillers (modified barite of example 1) were prepared according to the invention. The components are shown in the Table below:

| Components | Latex paint (% w/w) |
| --- | --- |
| Water (solvent) | 41.80 |
| Dimethyl polysiloxane (antifoam) | 0.15 |
| 2-Br nitropropano,1,3 diol (fungicide) | 0.20 |
| Carboxymethylcellulose (thickener) | 0.50 |
| Turpentine/white spirit (co-solvent) | 0.60 |
| Ammonia (pH adjustment) | 0.05 |
| Ethylene Glycol (rheology modifier) | 0.80 |
| Dipropyleneglycol methyl ether (Coalescent) | 0.40 |
| Acrylic dispersant (filler dispersant) | 0.20 |
| Nonyl phenol 10M (surfactant) | 0.05 |
| Sodium hexametaphosphate (wetting agent) | 0.25 |
| Titanium dioxide (pigment) | 16.00 |
| Calcium carbonate 325 (filler) | 5.20 |
| Modified barite of Example 1 (filler) | 17.00 |
| Micronized calcined kaolin (filler) | 2.50 |
| Acrylic styrene emulsion (Resin) | 16.00 |
| Bentonite (Anti-settling) | 0.30 |
| TOTAL | 100.00 |

Similar samples were also prepared with conventional unmodified fillers.

The formulation was prepared using a high speed disperser (VORTEX). Once the gel is formed with the ammonia water and cellulosic thickener, the wetting, dispersant and antifoam agents were added, stirring until controlling the physical aspect (grinding). Titanium dioxide was added, dispersing the paste up to a wedge of between 5 μm and 10 μm and then water was added dispersing during 30 minutes. After this time, modified and unmodified fillers were incorporated for each type of formulation, as well as the emulsion, and water for stabilizing purposes. Finally, co-solvents, fungicide and water were added to adjust the constants.

The paints were characterized following the guidelines of the IRAM 1070 Norm. Then, the inhibitory activity of the paints having the superficially modified fillers of the invention prepared according to the formulation in the previous Table was determined, as compared with conventional paint.

The tested microorganisms were *Escherichia coli* ATCC 25922 and *Staphylococcus aureus* ATCC 6538P (CCM-29-305).

From pure 24 hours cultures, equivalent suspensions to the turbidity of tube 0.5 of the McFarland scale (approximately $10^8$ cell/ml) were prepared in Luria-Bertani (LB) broth. Plates were seeded containing 20 ml LB agar with the prepared suspensions, in order to obtain a confluent growth of the colonies. After allowing the total absorption of the inoculum applied (approximately 5 minutes), fragments of alumina of approximately 1.5×1 cm as the support were placed with sterile clamps, the fragments containing the two paints, with and without modified fillers. The plates were incubated at 37° C., during 24 hours.

The modified filler paint proved to have inhibitory activity over the development of both microorganisms, and no inhibitory activity appeared in the paint with unmodified pigment.

This was proved by the formation of an inhibition ring around the support of the bactericide paint.

The bactericidal activity of paint with modified fillers was also determined over growing bacterial cultures.

From pure 24 hours cultures of the same microorganisms used for determining the inhibitory activity, suspensions equivalent to the turbidity of tube 0.5 of the McFarland scale (approximately $10^8$ cell/ml) were prepared in sterile physiological solution. 10 μl of the suspensions was dropped with pipette over the pieces painted with both paints, letting them to be completely absorbed (approximately 2 minutes).

At different times, arbitrarily set in 0, 1, 5, and 24 hours, the inoculated pieces were taken and were re-suspended in 2 ml of physiological solution, using vigorous stirring (vortex). For each time, viable microorganism counts were made twice: seriated dilutions at 1/10 were prepared and from each dilution, 100 μl were inoculated on plates containing LB agar, using Drigalsky spatulas to spread the inoculum. After allowing the total absorption of the inoculum applied (approximately 5 minutes) the plates were incubated at 37° C., during 24 hours.

The Table below shows the results obtained, taking the following parameters: the recovery percentage indicates the fraction of the microorganisms that may be recovered at each time from the plates containing the unmodified paint, that has to be taken into account for evaluating the "real effect" of the modified paint; the bacterial activity percentage indicates the direct or real effect of the modified paint.

The recovery percentage was calculated in relation to the initial time ($t_0$), while the bactericide activity percentage was determined from the percentage of recovered cells (recovery %)

TABLE bactericide effect of paint with modified fillers over sample microorganism cultures

| Time (hours) | *Escherichia coli* ATCC 25922 | | *Staphylococcus aureus* ATCC 6538P | |
|---|---|---|---|---|
| | Recovery % (control) | Bactericide activity % | Recovery % (control) | Bactericide activity % |
| 0* | 100 | 0 | 100 | 0 |
| 1 | 77 | 99.3 | 0.97 | >99.99 |
| 5 | 1.2 | ≧99.98 | ND | ND |
| 24 | ND | ND | ND | ND |

*initial inoculae ($t_0$): *E. coli*: $1.8 \times 10^6$ CFU/ml; *S. aureus*: $3.6 \times 10^4$ CFU/ml.
ND: non detectable

The invention claimed is:

1. A bactericidal filler composition comprising inorganic filler cores selected from the group consisting of chalk, calcite, calcium carbonate, dolomites, diatomites, mica, and barite, said cores being coated with submicrometric particles of a metal selected from the group consisting of gold, platinum, silver, and copper and/or salts thereof, said salts being selected from the group consisting of gold, platinum, silver and copper sulfates, cyanides, chlorides, acetates, and nitrates.

2. The bactericidal filler composition according to claim 1, consisting of barite cores coated with silver submicrometric particles.

3. The bactericidal filler composition according to claim 1, wherein the metal and/or metal salt particles coating the filler cores have a size of between 50-300 nm.

4. Use of a bactericidal filler composition according to claim 1 in the manufacture of latex paints.

5. Use of a bactericidal filler composition according to claim 1 in the manufacture of solvent based paints.

6. Use of a bactericidal filler composition according to claim 1 in the manufacture of powder paints.

7. Use of a bactericidal filler composition according to claim 1 in the manufacture of plasterings.

8. Use of a bactericidal filler composition according to claim 1 in the manufacture of putties.

9. Use of a bactericidal filler composition according to claim 1 in the manufacture of pre-dosed renderings.

10. Use of a bactericidal filler composition according to claim 1 in the manufacture of a hydrophobic mass material of the type used in coarse renderings.

\* \* \* \* \*